FLUX-RESPONSIVE RECORD-REPRODUCE SYSTEM

Filed March 14, 1960

INVENTOR.
JOSEPH W. GRATIAN
BY George J. Seligsohn
ATTORNEY

United States Patent Office 3,189,880
Patented June 15, 1965

3,189,880
FLUX-RESPONSIVE RECORD-REPRODUCE SYSTEM

Joseph Warren Gratian, Rochester, N.Y., assignor to General Dynamics Corporation, Rochester, N.Y., a corporation of Delaware Filed Mar. 14, 1960, Ser. No. 14,911
8 Claims. (Cl. 340—174.1)

This invention relates to magnetic recording systems and, more particularly, to a flux-responsive system for recording and reproducing analog data applied thereo.

Heads for recording and reproducing data of one form or another on a magnetic medium, such as magnetic tape, are well known in the art. Usually such a head consists of a ferromagnetic core having a narrow airgap. The gap is positioned in cooperative relationship with a moving tape on which is deposited a permanently magnetizable coating. The head further includes a coil wound about the ferromagnetic core. Signals to be recorded are applied to this coil and reproduced signals are derived from this coil. However, the physical phenomena which take place in recording and in reproduction are quite different.

In recording, the recording signal sets up a magnetic field in the core which results in a magnetomotive force across the gap. The strength of this magnetomotive force is proportional to the magnitude of the recording signal. This magnetomotive force produces a magnetic field in the vicinity of the gap, which is flux-linked with the portion of the moving magnetic tape which at any time is in cooperative relationship with the gap. In this manner, each portion of the tape, as it passes over the gap, is permanently magnetized with a polarity and magnitude which depends upon the then-existing polarity and magnitude of the recording signal.

If, in a first case, a direct current recording signal of a given polarity and magnitude is applied to the head, the magnetic tape will have recorded over the length thereof a constant level magnetic field. If, in a second case, the recording signal applied to the head is a sine wave, the magnetic tape will have recorded over the length thereof a magnetic field which varies in level and polarity sinusoidally.

In reproduction, however, the signal derived in the coil of the head is not dependent upon the strength of the magnetic field on a previously recorded moving magnetic tape, but rather on the rate of change of this magnetic field. Therefore, in the second case discussed above, where a sine wave was recorded on the magnetic tape, a sinusoidal signal will be induced in the coil of the head. However, in the first case, where a magnetic field of constant level was recorded on the tape, no signal will be induced in the coil of the head.

Generalizing, it will be seen that although a record-reproduce head of the conventional type, just described, is effective in recording direct current and very low frequency signals, it is not effective in reproducing direct current and very low frequencies, where the rate of change of flux is very small.

In analog data systems, it is often desirable to both record and reproduce analog signals which vary in magnitude at a very slow rate. Since the conventional record-reproduce head, described above, will not respond to these small changes during reproduction, it is necessary to utilize a carrier frequency, which has a rate of change which can be reproduced, and modulate this carrier frequency with the slow changing data signal. However, when this is done, the tape may be packed with data to only ten to twenty percent of the possible tape density. Thus, the amount of tape needed to record a given amount of data is increased five to ten times.

In order to overcome this problem, it would be most desirable to provide a record-reproduce head which is flux responsive, rather than rate of change of flux responsive, for reproducing as well as recording. It has been suggested in Patents 2,866,013 and 2,907,834 that a Hall cell composed of a semi-conductor material may be incorporated in a reproduce head to provide a reproduce head which is actually flux responsive, rather than responsive only to the rate of change of flux.

Furthermore, patent application Serial No. 764,974 filed October 2, 1958, by Joseph W. Gratian, entitled, "Semi-Conductor Magnetic Pickup," and assigned to the same assignee as the present invention, now Patent No. 3,041,414, issued June 26, 1962, which is incorporated by reference herein, discloses several configurations of flux-responsive heads utilizing Hall cells. Patent application Serial No. 764,974 further discloses that by the addition of a signal input winding suitably associated with the core, the Hall cell reproduce head may be also utilized as a recording head.

The present invention provides a flux-responsive record-reproduce system which makes the use of the Hall cell record-reproduce heads disclosed in patent application Serial No. 764,974 more feasible.

Briefly, in a Hall cell reproduce head, the magnetic core is provided with two narrow gaps and a thin slab of semi-conductor material is inserted in one of the gaps with the opposite faces thereof in contact with the core. A current is passed between one pair of opposite edges of the semi-conductor material and output conductors are connected to the other pair of opposite edges of the semi-conductor material. In accordance with Hall cell theory, when a current is passed through a material placed in a magnetic field having a component perpendicular to the direction of the current, a voltage will be developed across the material in a direction which is perpendicular to both the direction of the current and the aforesaid component of the magnetic field. The magnitude of this voltage will be a function of the particular material, the dimensions of this material, the magnitude of the perpendicular component of the magnetic field, and the magnitude of the current.

In the Hall cell reproduce head, a pre-recorded magnetic tape is passed in cooperative relationship with the other gap in the core. It will be seen that the intensity of the magnetic field applied to the Hall cell will depend upon the strength of the magnetized signal on the tape. Therefore, the output from the Hall cell will tend to be proportional to the strength of the magnetic signal on the tape.

It would appear, therefore, that a Hall cell reproduce head would be ideal, since it is very compact and utilizes throughout solid-state material not subject to microphonics. However, there have been serious problems with a head incorporating a Hall cell which have limited its practicability.

As stated above, the magnitude of the output of a Hall cell depends upon the material of which it is composed. For most materials, the Hall cell output is so negligible as to be useless. Even for very thin slabs of materials, such as certain semi-conductors, providing relatively high outputs and where the magnitude of the current passed through the Hall cell is the maximum that can be used without risking overheating of the Hall cell, the output voltage achieved is in the range of between fifty and two hundred microvolts. Therefore, the Hall cell has quite a low sensitivity which, when compared to the noise voltage developed, provides a low signal to noise ratio.

As implied in the last paragraph, in order to achieve reasonable sensitivity and signal to noise ratio to make a Hall cell useful in a reproduce head, it is necessary to provide an exciting current for the Hall cell which has a magnitude which is nearly the maximum that can be used without risking overheating of the Hall cell material.

However, the exciting current itself produces an accompanying magnetic field which has a magnitude proportional to the magnitude of the exciting currrent. Flux from the magnetic field produced by the exciting current will appear at the gap which is in cooperative relationship with the magnetic tape during playback. This flux acts to raise the noise level of the tape passing over the gap and if the magnitude of the exciting current is high enough, the flux appearing at the gap in cooperative relationship with the tape passing thereover will be strong enough to cause erasure of the signal from the magnetic tape.

Thus, a double-horned dilemma results, wherein a high magnitude exciting current is needed to achieve sufficient sensitivity and signal to noise ratio, but the use of a high magnitude exciting current results in raising the noise level of the tape, or even erasure of the tape. The existence of this problem has prevented record-reproduce heads incorporating Hall cells from achieving their apparent potential in recording and reproducing on magnetic tape low frequency signals.

It is, therefore, an object of the present invention to provide an improved flux-responsive record-reproduce system.

It is a further object of this invention to provide an improved flux-responsive record-reproduce system including a record-reproduce head incorporating a Hall cell.

It is a still further object of this invention in a record-reproduce head incorporating a Hall cell to provide means for canceling the flux due to the Hall cell excitation current appearing at the gap of the head which is in cooperative relationship with magnetic tape passing thereover.

One feature of the present invention is the utilization of the same coil wound around the core of a record-reproduce head incorporating a Hall cell for applying a record signal during recording periods and for applying a current during playback periods for substantially canceling the flux produced by the Hall cell exciting current.

Another feature of the present invention is the use of a single current source for providing recording bias during recording periods and for providing both Hall cell excitation current and current for canceling the flux in the gap in cooperative relationship with a magnetic tape during playback.

These and other objects, features and advantages of the present invention will become more apparent from the following detailed description taken together with the accompanying drawing, in which.

Figure 1:
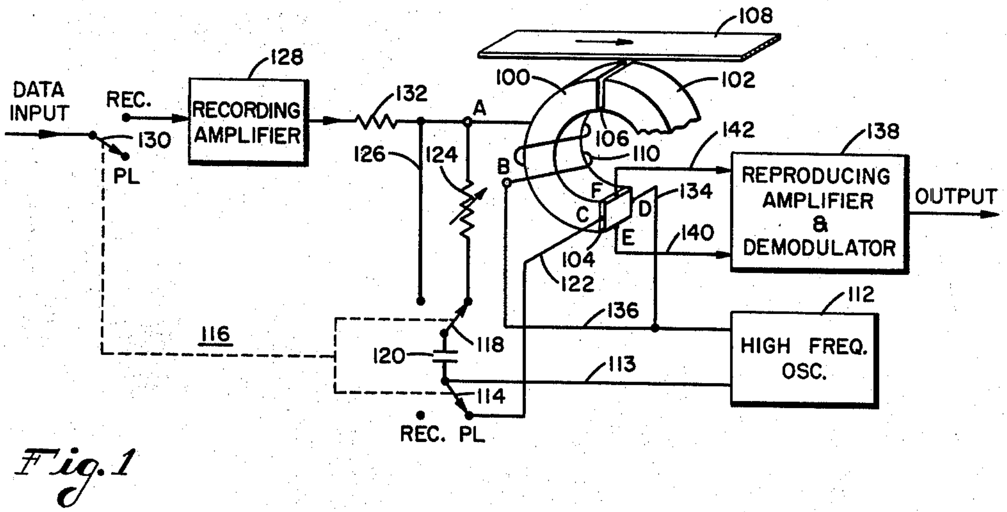
FIG. 1 is a schematic diagram of a preferred embodiment of the invention.

Referring now to FIG. 1, there is shown a first core portion 100 and a second core portion 102, both of which are composed of a ferromagnetic material. Although core portion 102 is shown broken away, it has the same semi-circular configuration as core portion 100. As shown, a slab of semi-conductor material, such as germanium, indium antimonide, indium arsenide, etc. has one face thereof cemented to one end of core portion 100 and the other face thereof cemented to one end of core portion 102. The slab of semi-conductor material 104, therefore, fills a gap between core portions 100 and 102. Since the thickness of the slab of semi-conductor material 104 is quite small, this gap, which is known as the back gap, is quite narrow.

As shown, the other ends of core portions 100 and 102, respectively, form another narrow gap 106, which is known as the front gap. In cooperative relationship with front gap 106 is magnetic tape 108, which is assumed to be movable from left to right as shown by the arrow.

Surrounding core portion 100 is coil 110. Together, core portions 100 and 102, slab of semi-conductor material 104, front gap 106 and coil 110 form the record-reproduce head.

A current source consisting of high frequency oscillator 112 has one terminal thereof connected through conductor 113 to wiper 114 of record-playback switch 116. Wiper 114 of record-playback switch 116 is connected to wiper 118 of record-playback switch 116 through capacitance 120.

When record-playback switch 116 is in its playback position, wiper 114 is connected through conductor 122 to edge C of the slab of semi-conductor material 104. In the record position of record-playback switch 116, wiper 114 is effectively disconnected.

In the playback position of record-playback switch 116, wiper 118 is connected to terminal A through variable resistance 124. In the record position of record-playback switch 116, wiper 118 is connected directly to terminal A through conductor 126. In the record position of record-playback switch 116, a data input is connected to the input of recording amplifier 128 by wiper 130 of record-playback switch 116. In the playback position of record-playback switch 116, wiper 130 is effectively disconnected.

The output from record amplifier 128 is connected to terminal A through resistance 132.

The other terminal of high frequency oscillator 112 is connected both to edge D, which is opposite and parallel to edge C, of the slab of semi-conductor material 104 through conductor 134 and to terminal B through conductor 136.

The other pair of opposite and parallel edges E and F, respectively, of the slab of semi-conductor material 104 are connected respectively as the input to reproducing amplifier and demodulator 138 through conductors 140 and 142.

Considering now the operation of the embodiment shown in FIG. 1, when record-playback switch 116 is in its record position, wiper 130 applies a data input to record amplifier 128. Record amplifier 128, in turn, applies the amplified data signal through resistance 132 to terminal A. At the same time, high frequency oscillator 112 applies a sinusoidal bias to terminal A through capacitance 120 and wiper 118. Therefore, the total signal applied to terminal A is the algebraic sum of the amplified data signal and the sinusoidal bias.

This total signal, which is applied to coil 110, results in a magnetomotive force across front gap 106 which is proportional in intensity to the instantaneous magnitude of the total signal applied to coil 110. This magnetomotive force is flux-linked with moving magnetic tape 108 as it passes by front gap 106.

As is well known, the wavelength of a signal recorded on a magnetic tape is proportional to the speed of movement of the magnetic tape and is inversely proportional to the frequency of the signal. The frequency of the sine wave from high frequency oscillator 112 is at least fifty kilocycles and the rate of speed of magnetic tape 108 is quite slow, so that the effective wavelength due to the sinusoidal bias is much smaller than the extent of front gap 106, i.e., several cycles of the sinusoidal wave take place in the time that it takes the point on moving magnetic tape 108 to pass from the leading edge of gap 106 to the lagging edge thereof. For this reason, the sinusoidal bias is not recorded on the tape, but only the slowly varying data input signal is recorded thereon. The purpose of the high frequency bias, as is well known in the art, is to insure that the operating point of magnetization of the tape, about which the data input signal is recorded, remains constant at zero level of magnetization. This greatly reduces noise due to different preexisting residual magnetizations at different points on the tape.

Thus, in the manner just described, a data input signal is recorded on magnetic tape 108. Since the recording is flux-responsive, frequency components of the data input signal down to zero frequency will be accurately recorded.

It is to be stressed again that although a high frequency sinusoidal bias is applied to coil 110, this sinusoidal bias is not recorded on magnetic tape 108, nor is the sinusoidal bias, which is only algebraically added to the data input signal, modulated by the data input signal. Therefore, the recorded signal on magnetic tape 108 does not include a carrier frequency so that the recorded data may be packed to the maximum possible tape density. Thus, much more data may be recorded on a given length of tape than would be possible with a modulated carrier signal.

During playback, record-playback switch 116 is in its playback position. In its playback position, a circuit is completed for applying high frequency sinusoidal current from high frequency oscillator 112 as the Hall cell exciting current between edges C and D of the Hall cell slab of semi-conductor material 104, which circuit includes conductor 113, wiper 114, conductor 122, terminals C and D of the slab of semi-conductor material 104, and conductor 134. In addition, the high frequency sinusoidal current is applied through coil 110 over a circuit including conductor 113, capacitance 120, wiper 118, variable resistance 124, terminal A, coil 110, terminal B, and conductor 136.

Variable resistance 124 is adjusted to a value such that the magnetic field at front gap 106 resulting from the sinusoidal exciting current passing through terminals C and D of the slab of semi-conductor material 104 is just canceled by the magnetic field at front gap 106 resulting from the current through coil 110.

As the magnetic tape 108 is played back, the magnetic field across the opposite faces of the slab of semi-conductor material 104 will vary in accordance with the previously recorded signal on tape 108.

The output voltage from the slab of semi-conductor material 104, appearing across terminals E and F thereof, will be proportional to both the instantaneous amplitude of the sinusoidal exciting current through terminals C and D and the magnetic field across the opposite faces of the slab of semi-conductor material 104. Therefore, the output signal obtained across terminals E and F of the slab of semi-conductor material 104 will be a modulated signal having a carrier frequency equal to the frequency of high frequency oscillator 112 modulated by the slowly varying recorded signal on magnetic tape 108. This modulated carrier signal is applied over conductors 140 and 142 to reproducing amplifier and demodulator 138. Since the input signal to reproducing amplifier and demodulator 138 is a modulated carrier signal, frequency selective high gain-narrow bandwidth amplifiers may be used for amplifying this signal, which, as well known in the art, greatly reduces the effects of noise by increasing to a marked degree the signal to noise ratio obtained at the amplifier output. This amplifier output is then demodulated.

The demodulated output from reproducing amplifier and demodulator 138 may then be applied to a utilization circuit, not shown, such as an indicator, etc.

Figure 2:
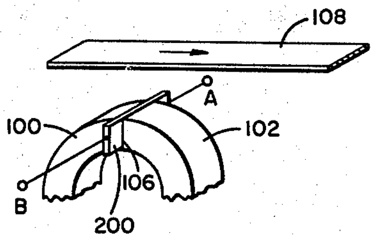
FIG. 2 is a fragmentary showing of a modification of the preferred embodiment shown in FIG. 1.

Referring now to FIG. 2, which shows a minor modification of the preferred embodiment shown in FIG. 1, a non-magnetic conductive shim 200 inserted in front gap 106 is substituted for coil 110 of FIG. 1.

The remaining circuitry, not shown, of FIG. 2 is identical to that of FIG. 1, the ends of conductive shim 200 being connected, as shown, to terminals A and B, respectively.

Shim 200 performs the same functions as coil 110, for which it is substituted, namely generating the recording magnetic field during recording, and generating the canceling magnetic field at front gap 106 during playback.

Figure 3:
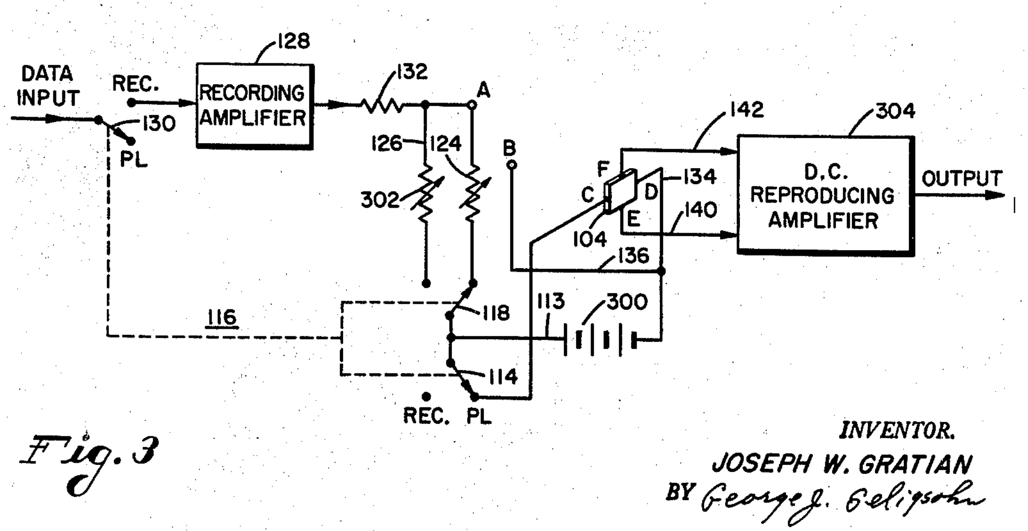
FIG. 3 is another modification of the preferred embodiment of the invention shown in FIG. 1.

Referring now to FIG. 3, there is shown a modification of the preferred embodiment of FIG. 1, wherein high frequency oscillator 112 is replaced by a direct current source 300.

In FIG. 3, capacitance 120 is omitted, and bias voltage from direct current source 300 is applied during recording to terminal A through variable resistance 302. Furthermore, reproducing amplifier and demodulator 138 of FIG. 1 is replaced in FIG. 3 by D.C. reproducing amplifier 304.

In FIG. 3, terminals A and B may be connected either across a coil of a record-reproduce head, similar to coil 110 of FIG. 1, or across a conductive shim of a record-reproduce head, similar to conductive shim 200 of FIG. 2. In all other respects, the embodiment of FIG. 3 is identical to the embodiment of FIG. 1.

Considering now the operation of the embodiment shown in FIG. 3, variable resistance 302 is adjusted to provide a D.C. bias at terminal A which causes per se the moving magnetic tape to be magnetized to a value which is approximately midway between zero magnetization and saturation. Thus, this D.C. bias provides an operating point of magnetization for the magnetic tape about which the recorded signal algebraically adds in accordance with the instantaneous magnitude and polarity of the applied data signal.

During playback, a constant exciting current is applied by direct current source 300 between terminals C and D of the slab of semi-conductor material 104. Therefore, the output signal derived across terminals E and F of the slab of semi-conductor material 104 is not modulated, as was the case in FIG. 1, but is a direct reproduction of the slowly varying recorded data signals. Therefore, in order to amplify this output signal, a D.C. reproducing amplifier, such as D.C. reproducing amplifier 304, must be utilized.

In all other respects, the embodiment of FIG. 3 operates in the same manner as the embodiment of FIG. 1.

It might be reiterated here that the use of a Hall cell composed of the slab of semi-conductor material 104, which is flux-responsive, rather than responsive only to the rate of change of flux, makes it possible during playback to derive an output signal therefrom which faithfully follows the low frequency, or even D.C., previously recorded data signal.

Although only preferred embodiments of the invention have been disclosed herein, it is not intended that the invention be restricted thereto, but that it cover modifications thereof within the skill of the art. For instance, where a D.C. Hall cell exciting current is utilized, a permanent magnet might be used for canceling the flux due to the exciting current in the vicinity of the front gap. Therefore, it is intended that the invention be limited only by the true spirit and scope of the appended claims.

What is claimed is:

1. In a magnetic recording system comprising a magnetic head including a magnetic core having a front gap and a back gap, and a Hall cell situated within said back gap, a current source, a record-playback switch having a record position and a playback position, first means responsive to said record-playback switch being in its playback position for appling excitation current from said current source to said Hall cell, electromagnetic means in cooperative relationship with said magnetic core, second means responsive to said record-playback switch being in its playback position for applying current from said current source through said electromagnetic means to produce a magnetic field in the vicinity of said front gap which substantially cancels that portion of the magnetic field due to said excitation current which exists in the vicinity of said front gap, third means responsive to said record-playback switch being in its record position for applying a data signal through said electromagnetic means, and fourth means responsive to said record-playback switch being in its record position for applying a record bias from said current source through said electromagnetic means.

2. The system defined in claim 1, wherein said electromagnetic means includes a coil wound about said magnetic core.

3. The system defined in claim 1, wherein said electromagnetic means includes a conductive shim situated within said front gap.

4. The system defined in claim 1, wherein said second means includes means for adjusting the magnitude of the current through said electromagnetic means.

5. The system defined in claim 1, wherein said current source is a high frequency oscillator, and further including a reproducing amplifier and demodulator having its input coupled to the output of said Hall cell.

6. The system defined in claim 1, wherein said current source is a D.C. source, and further including a D.C. reproducing amplifier having its input coupled to the output of said Hall cell.

7. The system defined in claim 6, wherein said fourth means includes means for adjusting the magnitude of said record bias.

8. In a magnetic recording system comprising a magnetic head, including a magnetic core having a front gap and a back gap, a Hall cell situated within said back gap, a current source for applying an excitation current to said Hall cell, the combination with said head comprising a conductive shim situated within said front gap, and means for applying current from said current source through said shim for substantially cancelling that portion of the magnetic field due to said excitation current which exists in the vicinity of said front gap.

References Cited by the Examiner

UNITED STATES PATENTS

| | | | |
|---|---|---|---|
| 2,536,260 | 1/51 | Burns | 179—100.2 |
| 2,924,775 | 2/60 | Neugebauer | 324—45 |
| 2,978,545 | 4/61 | Howling | 340—174.1 |

FOREIGN PATENTS

| | | |
|---|---|---|
| 38,962 | 9/56 | Germany. |

IRVING L. SRAGOW, *Primary Examiner.*

EVERETT R. REYNOLDS, *Examiner.*